United States Patent
Honji et al.

(10) Patent No.: US 12,171,157 B2
(45) Date of Patent: Dec. 24, 2024

(54) WORKING MACHINE AND CONTROL DEVICE

(71) Applicant: HONDA MOTOR CO., LTD., Tokyo (JP)

(72) Inventors: Masaya Honji, Wako (JP); Makoto Yamamura, Wako (JP); Tsukasa Sugino, Wako (JP); Takayuki Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 17/684,446

(22) Filed: Mar. 2, 2022

(65) Prior Publication Data

US 2022/0287229 A1 Sep. 15, 2022

(30) Foreign Application Priority Data

Mar. 12, 2021 (JP) .................................. 2021-040329

(51) Int. Cl.
*A01D 34/00* (2006.01)
*A01D 34/78* (2006.01)
(Continued)

(52) U.S. Cl.
CPC ........... *A01D 34/008* (2013.01); *A01D 34/78* (2013.01); *A01D 69/02* (2013.01); *A01D 2101/00* (2013.01)

(58) Field of Classification Search
CPC ...... A01D 34/008; A01D 34/78; A01D 69/02; A01D 2101/00; A01D 75/20
See application file for complete search history.

(56) References Cited

U.S. PATENT DOCUMENTS

2002/0065607 A1* 5/2002 Kunzeman ............. G01C 21/26
701/50
2011/0254708 A1* 10/2011 Anderson ............. B60Q 5/008
340/988

(Continued)

FOREIGN PATENT DOCUMENTS

CN 202026599 11/2011
JP 05-015231 1/1993

(Continued)

OTHER PUBLICATIONS

Japanese Office Action for Japanese Patent Application No. 2021-040329 mailed Jun. 4, 2024.

*Primary Examiner* — Joan T Goodbody
*Assistant Examiner* — Michael Lukon
(74) *Attorney, Agent, or Firm* — Amin, Turocy & Watson, LLP

(57) ABSTRACT

A working machine includes: a working drive source that generates a drive force; a working device that performs a predetermined work using the drive force of the working drive source; a sensor that acquires environmental information that is information on a surrounding environment of the working machine; and a control part that determines whether or not to perform an influence reduction control on the basis of the environmental information acquired by the sensor, and in a case where it is determined that the influence reduction control is to be performed, performs the influence reduction control which is a predetermined control that reduces an influence on the surrounding environment of a sound generated when the working device performs the predetermined work.

8 Claims, 6 Drawing Sheets

(51) Int. Cl.
*A01D 69/02* (2006.01)
*A01D 101/00* (2006.01)

(56) References Cited

U.S. PATENT DOCUMENTS

| | | | |
|---|---|---|---|
| 2018/0000025 A1 | 1/2018 | He et al. | |
| 2020/0277923 A1* | 9/2020 | Dixon | F02N 11/0803 |
| 2021/0382476 A1* | 12/2021 | Morrison | G06Q 10/20 |
| 2022/0195699 A1* | 6/2022 | Randleman | B60W 20/17 |

FOREIGN PATENT DOCUMENTS

| | | | |
|---|---|---|---|
| JP | 2002122470 A | * | 4/2002 |
| JP | 2005-016436 | | 1/2005 |
| JP | 2011-225212 | | 11/2011 |
| JP | 2018-061477 | | 4/2018 |
| JP | 2019-012312 | | 1/2019 |
| JP | 2019-187333 | | 10/2019 |

* cited by examiner

WORKING MACHINE AND CONTROL DEVICE

CROSS-REFERENCE TO RELATED APPLICATION

Priority is claimed on Japanese Patent Application No. 2021-040329, filed on Mar. 12, 2021, the contents of which are incorporated herein by reference.

BACKGROUND

Field of the Invention

The present invention relates to a working machine and a control device.

Background

With the development of automatic control technology, devices that perform various tasks are becoming widespread. For example, a working machine that autonomously travels in a predetermined working area and performs work such as mowing and cleaning is proposed. In the working machine, it is desired to suppress noise generated according to an operation of the device for performing work. For example, in a lawn mower, a technology for suppressing noise by setting an engine speed when lawn mowing work is not executed to a low speed is proposed (see, for example, Japanese Unexamined Patent Application, First Publication No. 2005-16436).

SUMMARY

However, the problem of noise of the working machine is not sufficiently solved. For example, noise generated when work is performed still affects a surrounding environment.

An object of an aspect of the present invention is to provide a technology capable of reducing an influence on a surrounding environment of a sound generated when work is performed.

According to an aspect of the present invention, there is provided a working machine including: a working drive source that generates a drive force; a working device that performs a predetermined work using the drive force of the working drive source; a sensor that acquires environmental information that is information on a surrounding environment of the working machine; and a control part that determines whether or not to perform an influence reduction control based on the environmental information acquired by the sensor, and in a case where it is determined that the influence reduction control is to be performed, performs the influence reduction control which is a predetermined control that reduces an influence on the surrounding environment of a sound generated when the working device performs the predetermined work.

According to the aspect of the present invention, it is possible to reduce an influence on a surrounding environment of a sound generated when work is performed.

DESCRIPTION OF EMBODIMENTS

Hereinafter, embodiments will be described in detail with reference to the accompanying drawings. The following embodiments do not limit the invention according to the claims, and all combinations of features described in the embodiments are not necessarily essential to the invention. Two or more of a plurality of features described in the embodiments may be arbitrarily combined. In addition, the same or similar configuration will be given the same reference sign, and duplicated explanations will be omitted.

<Outline of Working Machine Control System>

Figure 1:
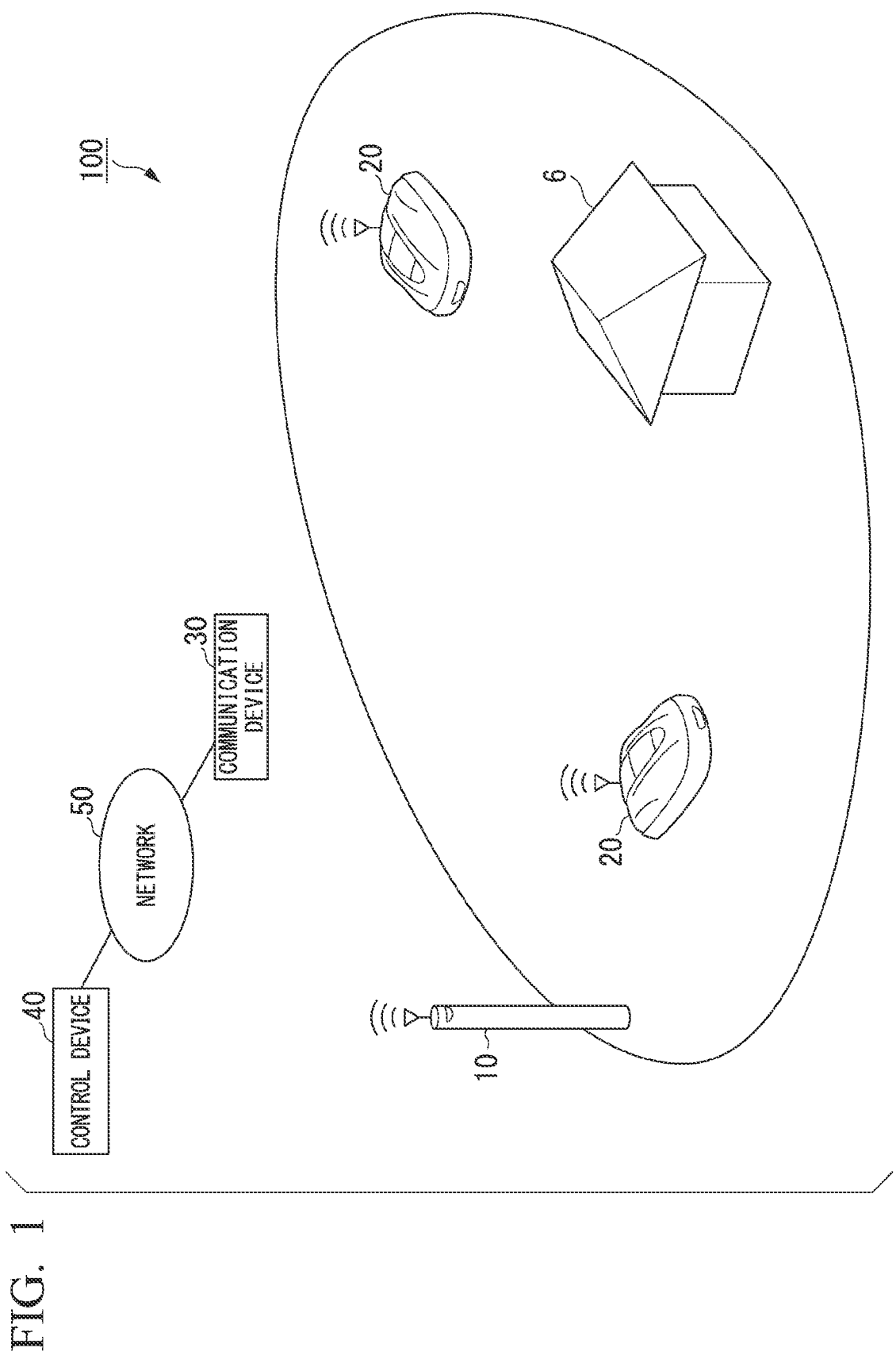
FIG. 1 is a view showing a configuration example of a working machine control system according to an embodiment.

FIG. 1 is a view showing a configuration example of a working machine control system 100 according to an embodiment. The working machine control system 100 includes an environment sensor 10, a working machine 20, a communication device 30, and a control device 40. The communication device 30 and the control device 40 are communicably connected via a network 50. The communication device 30 communicates with the environment sensor 10 and the working machine 20 through wireless communication. The communication device 30 may be configured using a communication device such as a base station device of a mobile communication network or an access point of a wireless local area network (LAN). A plurality of communication devices 30 may be provided for the network 50. The environment sensor 10 and the working machine 20 communicate with the control device 40 or other information devices connected to the network 50 by communicating with an appropriate communication device 30 according to a position, communication status, or the like thereof.

The network 50 may be a network using wireless communication or a network using wired communication. The network 50 may be configured by combining a plurality of networks. In an area where the working machine 20 performs work (hereinafter referred to as a "working area"), for example, a number of unspecified persons or animals may be present, a building 6 may be present, or a number of other unspecified objects may be present.

In a case where a predetermined influence condition is satisfied, the working machine 20 executes influence reduction control determined in advance. The influence condition is a predetermined condition indicating that a sound emitted by an own device (the working machine 20) is likely to affect a surrounding environment. For example, it may be defined as the influence condition that the own device is located in an area determined in advance, or it may be defined as the influence condition that the own device is located within a predetermined distance from a person, a living thing, or a predetermined facility. The influence reduction control is predetermined control for reducing an influence on the surrounding environment of a sound generated when the work is performed. For example, control that enables the own device to travel or perform the work with less sound than a normal operation may be defined as the influence reduction control, or control that enables traveling and working to be completed in a shorter time than a normal operation may be defined as the influence reduction control. In the following description, a specific example in which control that enables the own device to travel or to perform the work with less sound than a normal operation (hereinafter referred to as "low sound control") is defined as the influence reduction control will be described in detail.

<Environment Sensor>

The environment sensor 10 acquires information in the working area. The environment sensor 10 may be configured using, for example, a camera. In this case, the environment sensor 10 may take an image of a space in the working area and transmit the obtained image to the communication device 30. In addition, the environment sensor 10 may detect a person or an animal such as a dog or a cat present in the working area by analyzing the obtained image. In this case, the environment sensor 10 may transmit information indicating the detection result (for example, information indicating a position of the detected animal or information indicating a type of the detected animal) to the communication device 30. In this case, the environment sensor 10 may be configured using a light detection and ranging (LIDAR) instead of the camera.

<Working Machine>

Figure 2:
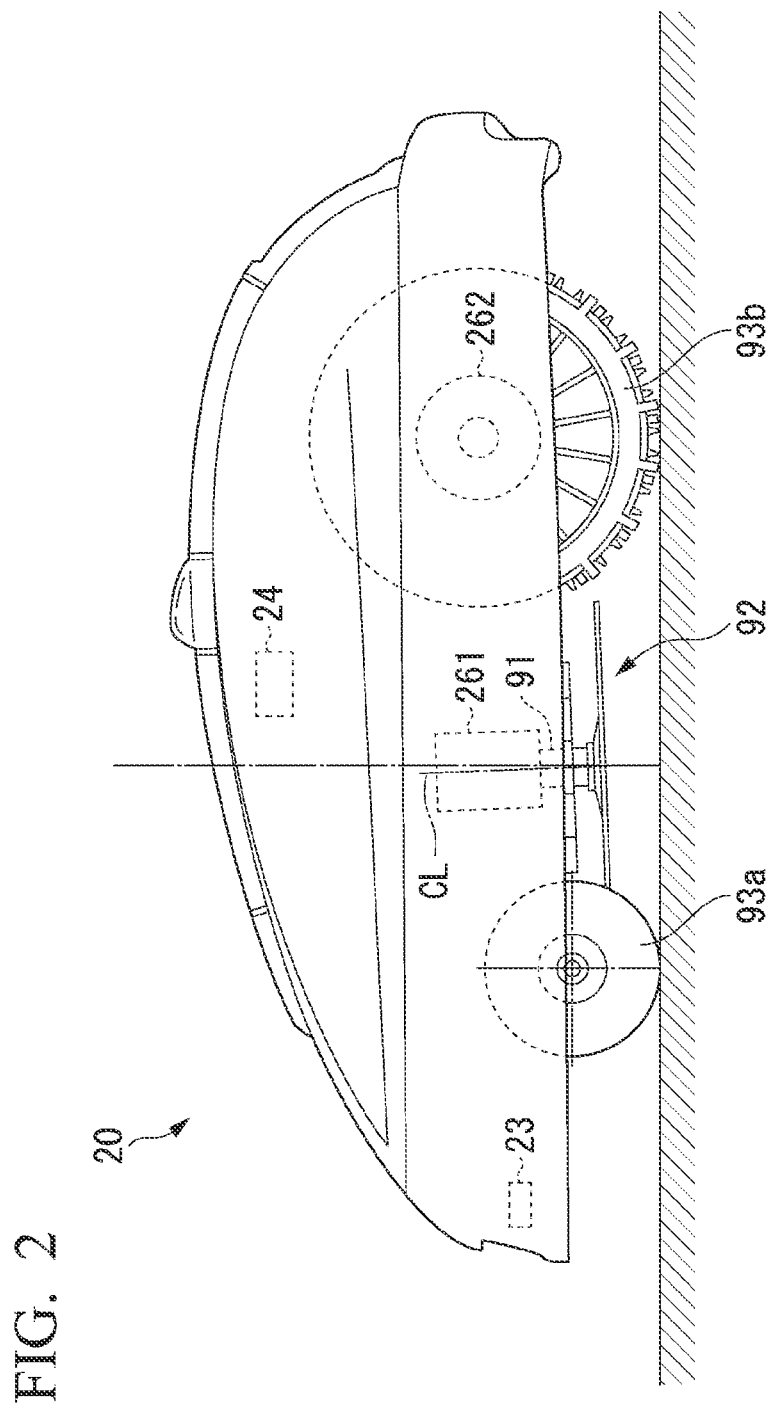
FIG. 2 is a view showing a specific example of an appearance of a working machine.
Figure 3:
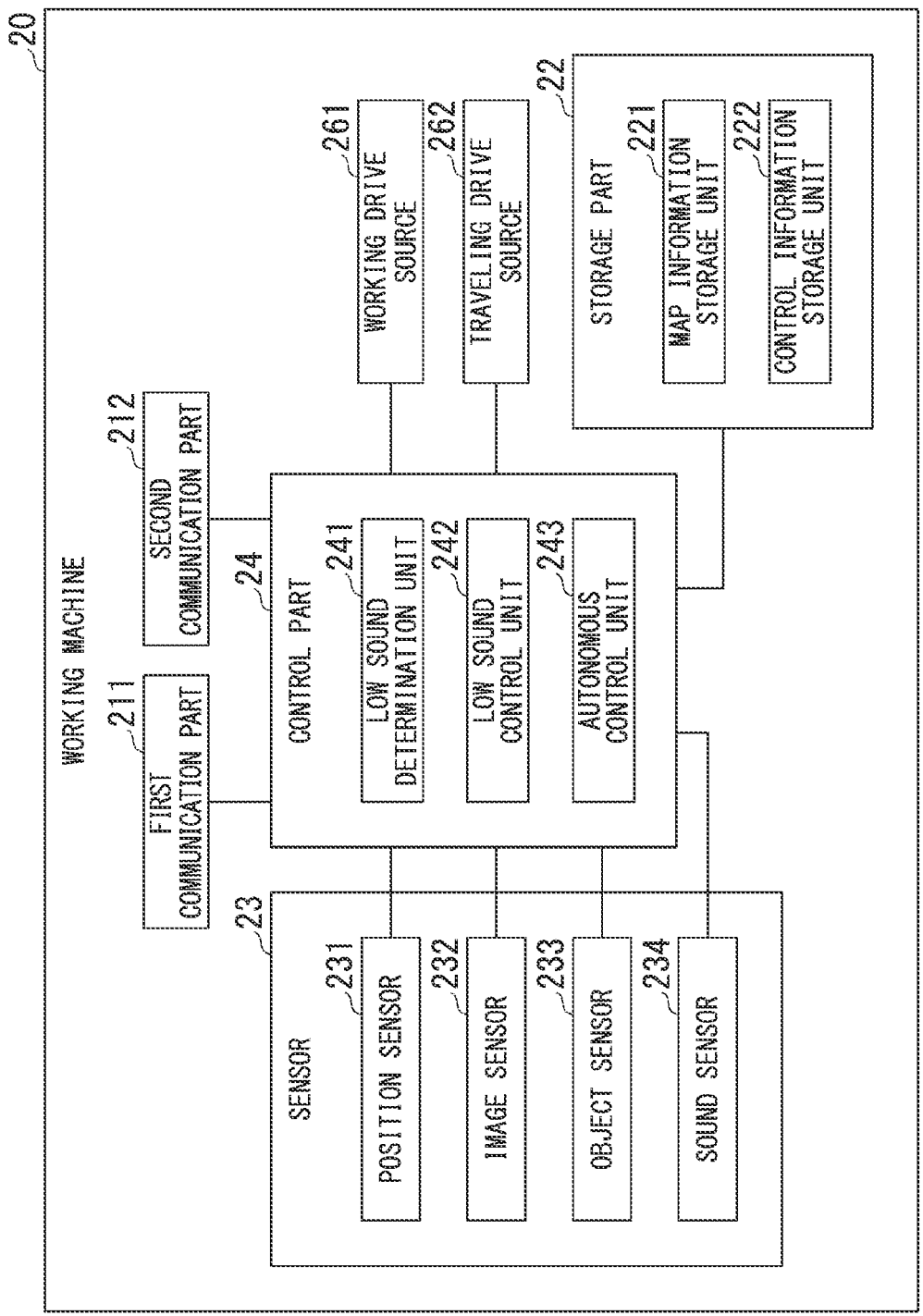
FIG. 3 is a diagram showing a specific example of a functional configuration of the working machine.

FIG. 2 is a view showing a specific example of an appearance of the working machine 20. FIG. 3 is a diagram showing a specific example of a functional configuration of the working machine 20. The working machine 20 of the present embodiment shown in FIGS. 2 and 3 is an apparatus that performs lawn mowing as the work. Therefore, for example, a cutting unit 92 for mowing the lawn is provided as a working device. However, the working machine 20 in the present embodiment does not have to be limited to the device that performs lawn mowing. For example, the working machine 20 may be configured as a cleaning machine that performs cleaning by operating a cleaning member (for example, a brush, a mop, or the like) according to an operation of a working drive source 261.

In this case, for example, a cleaning member and a rotating shaft may be provided as a working device. For example, the working machine 20 may be configured as a blower that generates an air flow (wind) by operating an air flow generator according to the operation of the working drive source 261 to blow off fallen leaves, cut grass, and the like. In this case, for example, the air flow generator may be provided as a working device.

The working machine 20 includes a first communication part 211, a second communication part 212, a storage part 22, a sensor 23, a control part 24, a working drive source 261, a traveling drive source 262, a rotating shaft 91, a cutting unit 92, a front wheel 93a, and a rear wheel 93b. The front wheel 93a and the rear wheel 93b rotate according to the drive of the traveling drive source 262. The working machine 20 travels according to the rotation of the front wheel 93a and the rear wheel 93b. The cutting unit 92 operates according to the drive of the working drive source 261 to perform lawn or grass mowing work (hereinafter referred to as "lawn mowing work"). Hereinafter, each configuration included in the working machine 20 will be described.

The first communication part 211 is a communication device that communicates by a first communication system. The first communication system is a communication system used for communication with the communication device 30. As the first communication system, for example, a wireless communication system such as a wireless LAN, for example, Wi-Fi, or Bluetooth, may be used. The first communication part 211 communicates with the communication device 30 according to the control of the control part 24.

The second communication part 212 is a communication device that communicates by a second communication system. The first communication system and the second communication system are different communication systems. The second communication system is a communication system used for communication with another working machine 20. As the second communication system, a communication system such as Bluetooth or infrared communication may be used. The second communication part 212 communicates with another working machine 20 according to the control of the control part 24.

The storage part 22 is configured using a storage device such as a magnetic hard disk device or a semiconductor storage device. The storage part 22 functions as, for example, a map information storage unit 221 and a control information storage unit 222.

The map information storage unit 221 stores map information. The stored map information is map information of at least an area including a working area. The map information includes information on a position of a facility or a building present in a target area of the map information. Specific examples of the facility include a house, a commercial facility, a restaurant, an amusement facility, a sports facility, and the like. The map information storage unit 221 may further store attribute information of each facility. As the attribute information, for example, information indicating a time zone in which each facility is used may be stored. For example, in a facility such as a commercial facility, a restaurant, an amusement facility, a sports facility, or the like where the time for use is limited, information indicating the time zone for use (for example, business start time and business end time) may be included in the attribute information. Further, if the facility is a house (a detached house, an apartment house, or the like), information indicating that the facility is a house may be included in the attribute information.

The control information storage unit 222 stores information indicating the content of control of the control part 24 (hereinafter referred to as "control information"). For example, the control information may include information indicating a determination criterion used when the control part 24 operates, or may include information indicating the content of the operation performed by the control part 24 in a case where the determination criterion is satisfied.

The sensor 23 is configured using one or a plurality of types of sensors. The sensor 23 acquires information on a surrounding environment of the working machine 20 (hereinafter referred to as "environmental information"). In the present embodiment, the sensor 23 includes a position sensor 231, an image sensor 232, an object sensor 233, and a sound sensor 234.

The position sensor 231 acquires position information of a current position of the own device. The position sensor 231 acquires the position information of the current position through communication with, for example, a satellite positioning system or a base station of a mobile phone network. Specific examples of the satellite positioning system include the Global Positioning System (GPS), Galileo, and the like. The position sensor 231 outputs the acquired position information to the control part 24.

The image sensor 232 generates an image representing an object near the working machine 20 or the like. The image sensor 232 outputs the generated image to the control part 24. The image sensor 232 may be configured using, for example, a camera that receives visible light to generate an image, or may be configured using a sensor (for example, LIDAR) that radiates infrared rays or electromagnetic waves having another wavelength to receive reflected light (reflected waves) and generate an image.

The object sensor 233 detects the presence of an object located near the working machine 20. The object sensor 233 outputs a signal or information indicating the detection result to the control part 24. The object sensor 233 may detect the presence of an object by radiating, for example, infrared rays, electromagnetic waves having another wavelength, or sound waves (ultrasonic waves) and receiving reflected light (reflected waves).

The sound sensor 234 detects a magnitude of a nearby sound. The sound sensor 234 outputs a signal or information indicating the detection result to the control part 24. One of the sounds detected by the sound sensor 234 is a sound generated from the working machine 20. Therefore, preferably, the sound sensor 234 can be attached to the working machine 20 in an orientation and at a position in which a magnitude of the sound generated from the working machine 20 (particularly the sound generated by the operation of the working drive source 261, the rotating shaft 91, and the cutting unit 92) can be detected.

The control part 24 is configured using a processor such as a central processing unit (CPU) and a memory. The control part 24 functions as a low sound determination unit 241, a low sound control unit 242, and an autonomous control unit 243 by executing a program by the processor. All or some of the functions of the control part 24 may be realized using hardware such as an application specific integrated circuit (ASIC), a programmable logic device (PLD), or a field programmable gate array (FPGA). The above program may be recorded on a computer-readable recording medium. The computer-readable recording medium is, for example, a portable medium such as a flexible disk, a magneto-optical disc, a ROM, a CD-ROM, or a semiconductor storage devices (for example, a solid state drive (SSD)), or a storage device such as a hard disk or a semiconductor storage device built in a computer system. The above program may be transmitted via a telecommunication line.

The low sound determination unit 241 acquires the environmental information and determines whether or not to perform the low sound control on the basis of the acquired environmental information. Hereinafter, some specific examples of determination processing by the low sound determination unit 241 will be given. The low sound determination unit 241 may determine that the low sound control is to be performed when the position of the own device (the working machine 20) is a position where the low sound control should be performed. As for the position where the low sound control should be performed, the area indicating the position (hereinafter referred to as a "low sound control area") may be determined in advance, or a criterion thereof (hereinafter referred to as a "position determination criterion") may be determined in advance. The low sound control area is one of specific examples of an influence reduction control area which is an area indicating the position where the influence reduction control should be performed.

The low sound control area may be defined in the map information stored in the map information storage unit 221, for example. In this case, the low sound determination unit 241 acquires information indicating the position of the own device (the working machine 20) from the position sensor 231 and determines whether or not the own device is located in the low sound control area defined in the map information. Then, in a case where it is determined that the own device is located in the low sound control area, the low sound determination unit 241 determines that the low sound control is to be performed.

Information indicating an additional condition for determining that the small control is to be performed in the low sound control area may be further defined in the map information. For example, as the additional condition, a day of the week for determining that the low sound control is to be performed may be defined, a time zone may be defined, it may be defined that a predetermined object such as a human body is detected, or it may be defined that a sound having a predetermined sound pressure or higher is detected.

In a case where the additional condition is defined, the low sound determination unit 241 determines that the low sound control is to be performed when the position of the own device is within the low sound control area and the additional condition is satisfied. In a case where a condition related to the sound is defined as the additional condition, the low sound determination unit 241 may determine whether or not the additional condition is satisfied on the basis of the detection result of the sound sensor 234. In a case where a condition related to the surrounding object is defined as the additional condition, the low sound determination unit 241 may determine whether or not the additional condition is satisfied on the basis of the detection result of the image sensor 232 or the object sensor 233. The additional condition may be defined in common to all the low sound control areas, or may be defined individually for each low sound control area.

The position determination criterion may be defined in the control information stored in the control information storage unit 222, for example. For example, it may be defined as a position determination criterion that the own device is within a predetermined distance from a facility or a building having a predetermined attribute. In this case, the low sound determination unit 241 may acquire the information indicating the position of the own device (the working machine 20) from the position sensor 231, may acquire the position information of the facility or the building having a predetermined attribute from the map information, and may determine whether or not the position determination criterion is satisfied by calculating these distances.

For example, a restaurant or a house may be defined as a facility or a building having a predetermined attribute. Different distances may be defined for each attribute. As an additional condition, different time zones or days of the week may be further defined for each attribute. For example, in a case where the own device is within a predetermined distance from a restaurant, it may be defined as the additional condition that it is within the business hours of the restaurant. For example, in a case where the own device is within a predetermined distance from a house, it may be defined as the additional condition that it is within a general bedtime (for example, from night to early morning).

For example, it may be defined as a position determination criterion that the own device is within a predetermined distance from a person or a living thing. In this case, the low sound determination unit 241 may acquire information indicating whether or not a person or a living thing is detected on the basis of the detection result of the image sensor 232 or the object sensor 233 and in a case where a person or a living thing is detected, may determine that the own device is within a predetermined distance. The low sound determination unit 241 may determine an area of a person's face or body by analyzing an image taken by the image sensor 232, and in a case where the area has a predetermined size or more, may determine that the own device is within a predetermined distance.

The low sound determination unit 241 may acquire a detection result of the environment sensor 10 as environmental information via the first communication part 211 and may determine whether or not the position determination criterion is satisfied on the basis of the acquired detection result. For example, position information of a person or a living thing determined in the environment sensor 10 may be acquired. Using such information, the low sound determination unit 241 can determine whether or not the own device is within a predetermined distance with respect to a person or a living thing at a position that cannot be directly detected due to being in the shadow of the own device (occurrence of occlusion or the like).

The low sound determination unit 241 may acquire information notified from another working machine 20 as environmental information via the second communication part 212 and may determine whether or not the position determination criterion is satisfied on the basis of the acquired information. For example, in another working machine 20, the position information of a person or a living thing determined on the basis of the image sensor 232 or the object sensor 233 may be acquired. Using such information, the low sound determination unit 241 can determine whether or not the own device is within a predetermined distance with respect to a person or a living thing at a position that cannot be directly detected due to being in the shadow of the own device (occurrence of occlusion or the like).

The low sound determination unit 241 may acquire information notified from the control device 40 as environmental information via the first communication part 211 and may determine whether or not the position determination criterion is satisfied on the basis of the acquired information. Specific examples of such a position determination criterion include a determination as to whether or not the own device is within a predetermined distance from a position of a communication terminal. Since the communication terminal is generally carried by a person, the position of the communication terminal is often almost equal to a position of the person. Therefore, it is possible to determine whether or not the own device is within a predetermined distance from a person on the basis of whether or not the own device is within a predetermined distance from the position of the communication terminal. In this case, the information on the position of each communication terminal may be notified from the control device 40.

In a case where a person or a living thing is detected on the basis of the image sensor 232 or the object sensor 233, the low sound determination unit 241 may notify information indicating the detection result (for example, the detected position) to another working machine 20 via the second communication part 212.

The low sound control unit 242 performs the low sound control in a case where the low sound determination unit 241 determines that the low sound control is to be performed. The low sound control is control in which a volume of the sound generated by the working machine 20 is smaller than that in a case where the normal control is performed. The low sound control may be, for example, predetermined control in which an operation sound of the working drive source 261 becomes smaller. Specifically, the low sound control may be, for example, control in which a displacement amount per unit time of the cutting unit 92 which is a working device becomes smaller. More specifically, the low sound control may be, for example, control in which a rotation speed per unit time of the rotating shaft 91 (the working device) becomes a smaller value than in the normal control.

The autonomous control unit 243 autonomously controls an operation of the own device (the working machine 20). For example, the autonomous control unit 243 may determine a traveling stroke and a traveling speed of the own device and may control an operation of the traveling drive source 262 and a direction of a wheel 93. For example, the autonomous control unit 243 may determine whether or not the own device performs predetermined work and may control an operation of the working drive source 261.

The working drive source 261 drives the cutting unit 92 attached to a bottom surface of a machine body under the control of the control part 24 to mow a grass such as a lawn extending from the ground surface across the cutting unit 92.

The cutting unit 92 is configured using, for example, a cutter blade. The working drive source 261 may be configured using, for example, a motor or an engine.

The traveling drive source 262 can move the working machine 20 by rotating the rear wheel 93b. The traveling drive source 262 may be configured using, for example, a motor or an engine.

Figure 4:
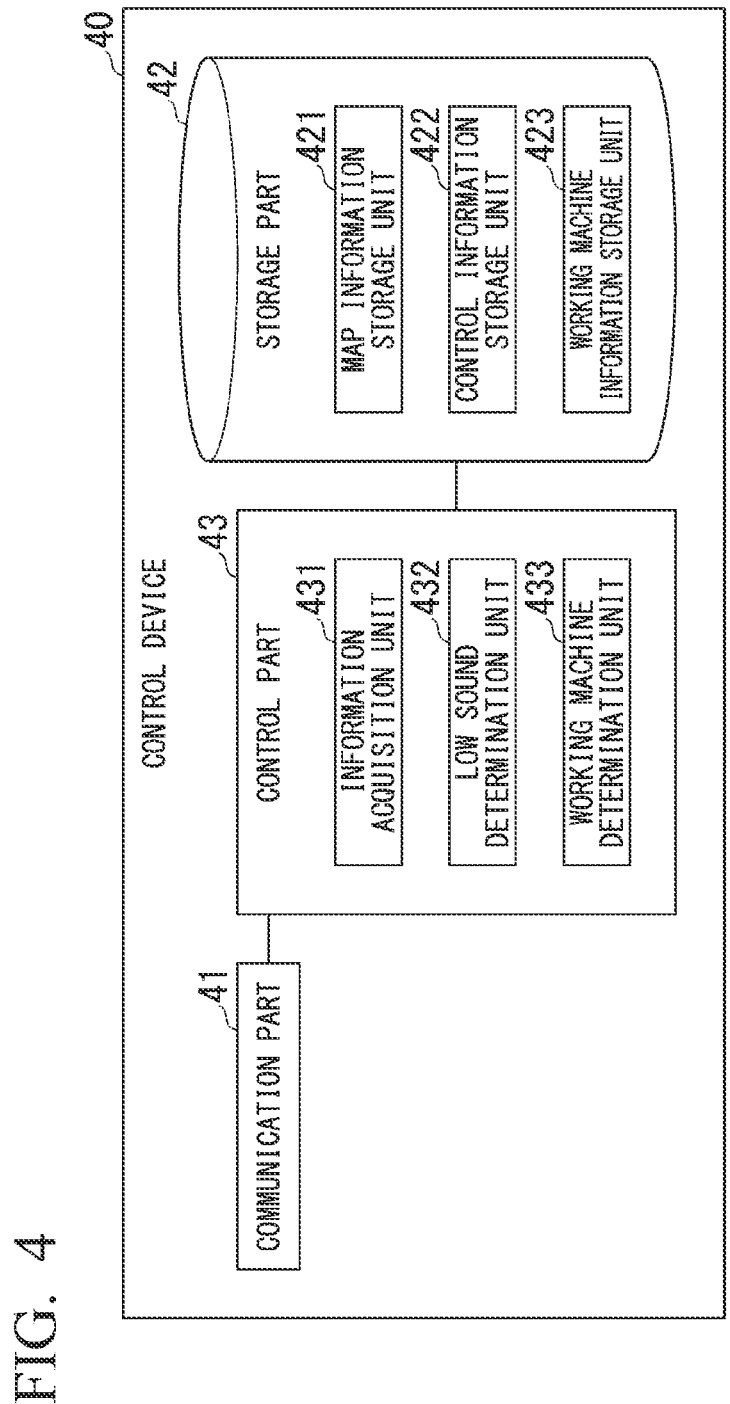
FIG. 4 is a schematic block diagram showing a specific example of a functional configuration of a control device.

FIG. 4 is a schematic block diagram showing a specific example of a functional configuration of the control device 40. The control device 40 is configured using an information processing device such as a personal computer, a smartphone, a tablet, a server device, or a single board computer. The control device 40 includes a communication part 41, a storage part 42, and a control part 43.

The communication part 41 is configured using a communication device. The communication part 41 communicates with the communication device 30 via the network 50. The communication part 41 communicates with the environment sensor 10 or the working machine 20 via the communication device 30.

The storage part 42 is configured using a storage device such as a magnetic hard disk device or a semiconductor storage device. The storage part 42 includes a map information storage unit 421, a control information storage unit 422, and a working machine information storage unit 423. The map information storage unit 421 and the control information storage unit 422 store the same type of information as the map information storage unit 221 and the control information storage unit 222, respectively.

The working machine information storage unit 423 stores information on a plurality of working machines 20 to be controlled. The working machine information storage unit 423 stores at least information indicating a level of a volume of the sound of the operation of the working machine 20 directly or indirectly for each working machine 20 (hereinafter referred to as "operation sound information"). For example, information indicating a level of an average volume of the sound generated in a case where each working machine 20 performs a normal operation may be defined as the operation sound information. In this case, a volume of the sound during traveling may be defined as the operation sound information, or a volume of the sound during work may be defined as the operation sound information. For example, information indicating whether the traveling drive source 262 of each working machine 20 is a motor or an engine may be defined as the operation sound information. For example, information indicating whether the working drive source 261 of each working machine 20 is a motor or an engine may be defined as the operation sound information.

The control part 43 is configured using a processor such as a CPU and a memory. The control part 43 functions as an information acquisition unit 431, a low sound determination unit 432, and a working machine determination unit 433 by executing a program by the processor. All or some of the functions of the control part 43 may be realized using hardware such as an ASIC, a PLD, or an FPGA. The above program may be recorded on a computer-readable recording medium. The computer-readable recording medium is, for example, a portable medium such as a flexible disk, a magneto-optical disk, a ROM, a CD-ROM, or a semiconductor storage devices (for example, a solid state drive (SSD)), or a storage device such as a hard disk or a semiconductor storage device built in a computer system. The above program may be transmitted via a telecommunication line.

The information acquisition unit 431 acquires information by communicating with another device via the communication part 41. The information acquisition unit 431 may acquire the information output from the environment sensor 10 by communicating with the environment sensor 10, for example. The information acquisition unit 431 may acquire at least information indicating the position of the communication terminal in the working area by communicating with a position information server (not shown), for example. Specific examples of such a communication terminal include a mobile communication device such as a smartphone or a mobile phone. The information acquisition unit 431 may acquire information on the magnitude of a working sound obtained by the sound sensor 234 of each working machine 20 from each working machine 20, for example. In this case, the information acquisition unit 431 may register the obtained information in the working machine information storage unit 423 as the operation sound information.

The low sound determination unit 432 determines whether or not to perform the low sound control for each working machine 20 to be controlled. The low sound determination unit 432 may perform determination processing for each working machine 20 by performing the same processing as the low sound determination unit 241 of the working machine 20. The low sound determination unit 432 may notify information indicating the determination result to each working machine 20. In this case, each working machine 20 may operate according to the information notified from the control device 40.

The working machine determination unit 433 determines a working machine 20 to be operated and an area where the working machine 20 works (hereinafter referred to as an "allocation area") for each working machine 20 to be controlled. The working machine determination unit 433 allocates an area including an area for which it is determined that the low sound control should be performed to a working machine 20 capable of operating with relatively low sound (hereinafter referred to as a "low sound device") in the working machines 20 to be controlled as the allocation area on the basis of the same criterion used for the determination processing by the low sound determination unit 432, for example. The working machine determination unit 433 allocates an area for which it is determined that the low sound control is not necessary to a working machine 20 that cannot operate with relatively low sound (hereinafter referred to as a "normal device") in the working machines 20 to be controlled as the allocation area on the basis of the same criterion used for the determination processing by the low sound determination unit 432, for example. As the normal device, a working machine 20 capable of performing work at a higher speed (more efficiently) may be defined instead of using a criterion of whether or not the device can be operated with a low sound.

The working machine 20 capable of operating with less sound may be determined on the basis of the operation sound information, for example.

In a case where the volume of the sound during work is defined as the operation sound information, a working machine 20 having a smaller volume of the sound during work may be selected as the working machine 20 capable of operating with less sound. In a case where the type of the traveling drive source 262 or the working drive source 261 is defined as the operation sound information, for example, a working machine 20 operated by a motor may be selected as the working machine 20 capable of operating with less sound. In a case where a maintenance implementation time is defined as the operation sound information, for example, a working machine 20 having a shorter elapsed time from the maintenance implementation time may be selected as the working machine 20 capable of operating with less sound.

The working machine determination unit 433 transmits a control signal to each working machine 20 on the basis of the determination result and instructs the work in each allocated area.

Figure 5:
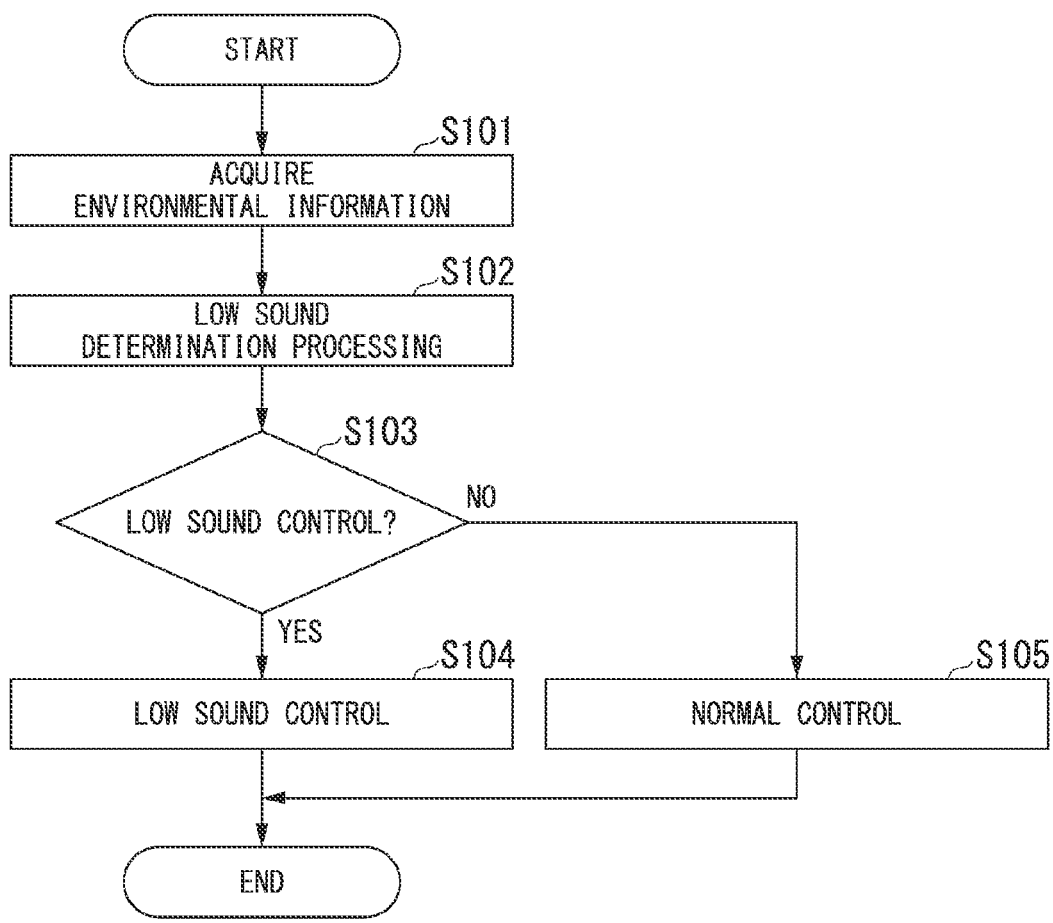
FIG. 5 is a flowchart showing a specific example of a processing flow in a control part of the working machine.

FIG. 5 is a flowchart showing a specific example of a processing flow in the control part 24 of the working machine 20.

First, the low sound determination unit 241 acquires environmental information using the sensor 23, the first communication part 211, or the second communication part 212 of the own device (step S101). The low sound determination unit 241 performs low sound determination processing on the basis of the acquired environmental information (step S102). In a case where it is determined that the low sound control is to be performed as a result of the low sound determination processing (YES in step S103), the low sound control unit 242 controls the own device (the working machine 20) to operate with a low sound (step S104). In a case where it is determined that the low sound control is to not be performed as a result of the low sound determination processing (NO in step S103), the low sound control unit 242 controls the own device (the working machine 20) to operate with a normal sound (step S105).

Figure 6:
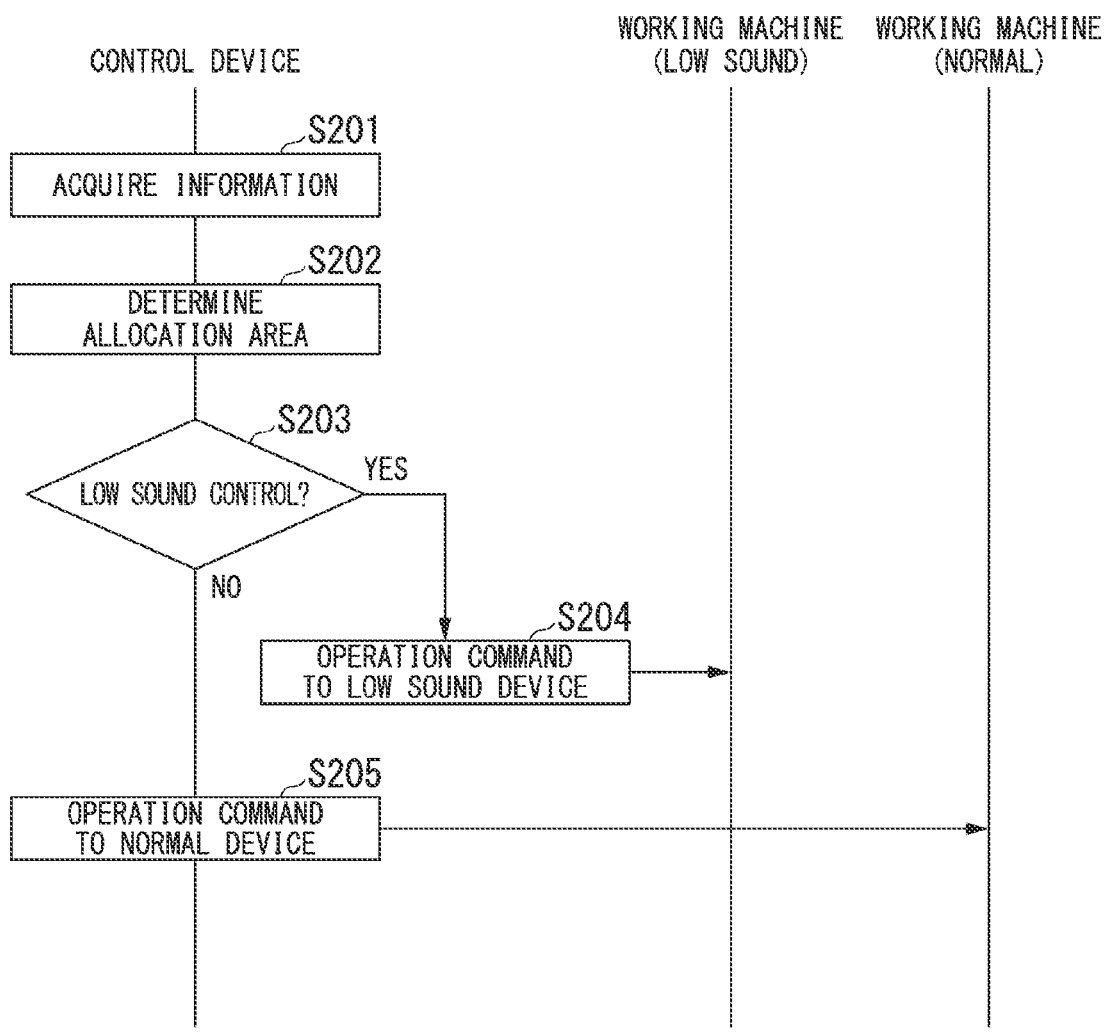
FIG. 6 is a sequence chart showing a specific example of a processing flow in a control part of the control device.

FIG. 6 is a sequence chart showing a specific example of a processing flow in the control part 43 of the control device 40. First, the information acquisition unit 431 acquires information (step S201). The working machine determination unit 433 determines an allocation area on the basis of the acquired information (step S202). The working machine determination unit 433 allocates a low sound device to a working machine 20 operating in the allocation area including an area for which it is determined that the low sound control should be performed in the allocation area (YES in step S203). The working machine determination unit 433 transmits an operation command including information on the allocation area to the allocated low sound device (step S204). The working machine determination unit 433 allocates a normal device to a working machine 20 operating in an area for which it is determined that the low sound control is not necessary in the allocation area (NO in step S203). The working machine determination unit 433 transmits an operation command including information on the allocation area to the allocated normal device (step S205).

With such a configuration, it is possible to reduce the influence on the surrounding environment of noise generated when the working machine 20 performs work. More specifically, when it is determined whether or not to the operation should be performed with a low sound according to the surrounding environment, in a case where it is determined that the operation should be performed with a low tone, control is performed such that the operation is performed with a low sound, and thus the influence of the sound can be reduced.

As described above, the low sound control is a specific example of the influence reduction control. In a case where it is determined that control is to be performed such that the operation is performed with a low sound, the control part 24 may perform control in which although the volume of the sound is the same as or higher than that of the normal control, the working speed or the traveling speed is higher than that of the normal control (hereinafter referred to as "high speed control") instead of the low sound control as the influence reduction control. For example, the control part 24 performs the high speed control in a case where it is determined that control is to be performed such that the operation is performed with a low sound. The control part 24 may control the traveling drive source 262, for example, to perform traveling at a higher speed (for example, to increase a rotation speed of the wheel 93) and may control the working drive source 261 such that the work can be performed at a higher speed (for example, to increase a rotation speed per unit time of the rotating shaft 91). By being controlled in this way, it is possible to shorten the time during which the working machine 20 is located in a certain area (for example, the low sound control area). Therefore, it is possible to reduce the influence of the sound of the working machine 20 on the environment in that region.

The working machine 20 may be configured not to include the autonomous control unit 243. In this case, the working machine 20 may be operated by a person, for example.

The working machine 20 may be configured not to include the autonomous control unit 243 and the traveling drive source 262. In this case, the working machine 20 may be operated by a person, and the working machine 20 may be configured to move with the movement of the person.

Summary of Embodiment

The above embodiment discloses at least the following working machine and control device.

A working machine (for example, a working machine 20) of the above embodiment includes a working drive source (for example, a working drive source 261) that generates a drive force; a working device (for example, a rotating shaft 91, a cutting unit 92) that performs predetermined work using the drive force of the working drive source; a sensor (for example, a sensor 23) that acquires environmental information that is information on a surrounding environment of an own device; and a control part (for example, control part 24) that determines whether or not to perform influence reduction control on the basis of the environmental information acquired by the sensor, and in a case where it is determined that the influence reduction control is to be performed, performs the influence reduction control which is predetermined control to reduce an influence on the surrounding environment of a sound generated when the working device performs the predetermined work.

According to this embodiment, it is determined whether or not to perform the influence reduction control on the basis of the environmental information. Therefore, according to the environment, it is possible to reduce the influence on the surrounding environment of the sound generated when the working device performs predetermined work.

According to the above embodiment, the sensor acquires position information indicating a position of the own device, and the control part acquires map information indicating an influence reduction control area which is an area where the influence reduction control should be performed, and in a case where the position of the own device is within the influence reduction control area, determines that the influence reduction control is to be performed.

According to this embodiment, it is possible to perform the influence reduction control on the basis of the map information indicating the influence reduction control area which is an area where the influence reduction control should be performed.

According to the above embodiment, the sensor acquires information indicating whether or not a person or a living thing is present near the own device, and in a case where the information indicating that a person or a living thing is present near the own device is acquired, the control part determines that the influence reduction control is to be performed.

According to this embodiment, it is possible to perform the influence reduction control only in a case where a person or a living thing is present near the own device. Therefore, it is possible to prevent a decrease in efficiency due to unnecessarily performing the influence reduction control.

According to the above embodiment, a communication part (for example, a first communication part 211, a second communication part 212) that communicates with another device is further provided, the sensor acquires position information indicating a position of the own device, and the control part transmits the position information to another device via the communication part and determines whether or not to perform the influence reduction control on the basis of information received from another device for determining whether or not the own device performs the influence reduction control.

According to this embodiment, the determination result of whether or not to perform the influence reduction control can be acquired from another device. Therefore, it is not necessary to determine whether or not to perform the influence reduction control in the working machine main body, and it is possible to reduce the price and weight of the working machine.

According to the above embodiment, the control part determines whether or not to perform the influence reduction control further on the basis of at least one piece of information of a day of the week, a date, or a time.

According to this embodiment, the influence reduction control can be performed on the basis of the information such as a day of the week, a date, or a time. Therefore, it is possible to perform the influence reduction control at a timing when it is desired to suppress the influence of the sound to a low level, such as at night or early morning (for example, a general bedtime).

According to the above embodiment, the working device includes a cutting unit (for example, a cutting unit 92) that cuts a lawn or grass and a transmission unit (for example, a rotating shaft 91) that displaces the cutting unit using the drive force of the working drive source, and the control part changes a displacement amount per unit time of the cutting unit when performing the influence reduction control.

According to this embodiment, by changing a displacement amount per unit time of the cutting unit, it is possible to control the volume of the sound generated by the displacement of the cutting unit and suppress the influence on the surroundings to a low level.

According to the above embodiment, a traveling drive source (for example, a traveling drive source 262) that generates a drive force to drive the own device is further provided, and the control part controls an operation of the traveling drive source when performing the influence reduction control.

According to this embodiment, by changing the traveling speed, it is possible to suppress the influence on the surroundings to a low level. For example, by slowing down the traveling speed, the volume of the sound generated by the traveling can be suppressed to a low level. For example, by increasing the traveling speed, it is possible to shorten the time that the working machine is located in a certain area and suppress the influence in that area to a low level.

A control device (for example, a control device 40) of the above embodiment includes a communication part (for example, a communication part 41) that communicates with another device; a working machine information storage unit (for example, a working machine information storage unit 423) that stores information on a plurality of working machines in advance; a map information storage unit (for example, a map information storage unit 421) that stores map information which is information on an area where the working machine is caused to perform predetermined work; and a control part (for example, a control part 43) that determines a combination of an area where influence reduction control should be performed, an area where the influence reduction control is not necessary, and a working machine that works in that area on the basis of the information on the working machine and instructs work in an area allocated to each working machine on the basis of the determination result via the communication part.

According to this embodiment, by appropriately allocating the area where the influence reduction control should be performed and the area where the influence reduction control is not necessary on the basis of the performance of the working machine and the like, it is possible to reduce the influence on the surrounding environment of the sound generated when the working device performs the predetermined work.

According to the above embodiment, the working machine information storage unit stores information on maintenance performed on each working machine, and the control part determines a combination of the area and the working machine on the basis of the information on the maintenance.

According to this embodiment, the combination of each area and the working machine can be appropriately determined on the basis of the maintenance status of each working machine.

According to the above embodiment, the working machine information storage unit stores information on a sound generated in each working machine, and the control part determines a combination of the area and the working machine on the basis of the information on the sound.

According to this embodiment, the combination of each area and the working machine can be appropriately determined on the basis of the sound generated in each working machine.

Although forms for carrying out the present invention have been described above using the embodiments, the present invention is not limited to these embodiments, and various modifications and substitutions can be made without departing from the gist of the present invention. The technical scope of the present invention also includes embodiments obtained by appropriately combining the technical means disclosed in the different embodiments.

What is claimed is:

1. A working machine comprising:
a working drive source that generates a drive force;
a working device that performs a predetermined work using the drive force of the working drive source;
a sensor that acquires environmental information that is information on a surrounding environment of the working machine;
a traveling drive source that generates a drive force which causes the working machine to travel; and
a control part that determines whether or not to perform an influence reduction control that reduces an influence on the surrounding environment of a sound generated by the working device when the working device performs the determined work, based on the environmental information acquired by the sensor, and in a case where it is determined that the influence reduction control is to be performed, the control part performs, as the influence reduction control, a low sound control that reduces a volume of the sound generated when the working device performs the predetermined work,
wherein the sensor acquires position information indicating a position of the working machine, and
wherein the control part acquires map information indicating a low sound control area which is an area where the low sound control should be performed as the influence reduction control, and in a case where the position of the working machine is within the low sound control area, the control part determines that the low sound control is to be performed as the influence reduction control,
wherein the control part controls an operation of the traveling drive source such that the drive force of the traveling drive source is increased when performing the low sound control,
wherein, in response to the increased drive force, the working machine operates at a higher speed in order to shorten a time during which the working machine is located in the low sound control area so as to reduce the influence of the sound of the working machine in the low sound control area.

2. The working machine according to claim 1,
wherein the sensor acquires information indicating whether or not a person or a living thing is present near the working machine, and
wherein, in a case where the information indicating that a person or a living thing is present near the working machine is acquired, the control part determines that the low sound control is to be performed.

3. The working machine according to claim 1, further comprising:
a communication part that communicates with another device,
wherein the sensor acquires position information indicating a position of the working machine, and
wherein the control part transmits the position information to the another device via the communication part and determines whether or not to perform the low sound control based on information received from the another device for determining whether or not the working machine performs the low sound control.

4. The working machine according to claim 1,
wherein the control part determines whether or not to perform the low sound control further based on information of at least one of a day of the week, a date, and a time.

5. The working machine according to claim 1,
wherein the working device comprises a cutting unit that cuts a lawn or grass and a transmission unit that displaces the cutting unit using the drive force of the working drive source, and
wherein the control part decreases a displacement amount per unit time of the cutting unit when performing the low sound control.

6. An information processing control device comprising:
a communication part that communicates with another device;
a working machine information storage that stores information on a plurality of working machines in advance;
a map information storage unit that stores map information which is information on an area where a working machine among the plurality of working machines is caused to perform a predetermined work;
a traveling drive source that generates a drive force which causes the working machine to travel; and
a control part that determines a combination of a first area comprising a low sound control area where a low sound control that reduces a volume of a sound generated by the working device when the working machine performs the predetermined work should be performed as an influence reduction control that reduces an influence on a surrounding environment of the sound generated when the working machine performs the predetermined work, a second area where it is not necessary to perform the low sound control as the influence reduction control, and a working machine that works in each of the first area and the second area based on the information on the working machine and instructs the predetermined work in any of the first area and the second area allocated to each working machine based on a determination result via the communication part,
wherein the control part allocates the first area to a first working machine that is capable of operating with relatively low sound among the plurality of working machines and allocates the second area to a second working machine that is not capable of operating with relatively low sound among the plurality of working machines,
wherein the control part controls an operation of the traveling drive source such that the drive force of the traveling drive source is increased when performing the low sound control,
wherein, in response to the increased drive force, the working machine operates at a higher speed in order to shorten a time during which the working machine is located in the low sound control area so as to reduce the influence of the sound of the working machine in the low sound control area.

7. The information processing device according to claim 6,
wherein the working machine information storage stores information on a maintenance performed on each working machine, and
wherein the control part determines a combination of the first area, the second area, and the working machine based on the information on the maintenance.

8. The information processing device according to claim 6,
wherein the working machine information storage stores information on the sound generated in each working machine, and
wherein the control part determines a combination of the first area, the second area, and the working machine based on the information on the sound.

* * * * *